US011271914B2

(12) United States Patent
Johansen et al.

(10) Patent No.: US 11,271,914 B2
(45) Date of Patent: Mar. 8, 2022

(54) EXTERNAL CONTACT CONNECTIONS TO AUTHENTICATE AND CONTEXTUALIZE ENTITY

(71) Applicant: MICROSOFT TECHNOLOGY LICENSING, LLC, Redmond, WA (US)

(72) Inventors: Amund Kronen Johansen, Tromso (NO); Krister Mikalsen, Tromso (NO); Jon Meling, Tromso (NO)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 42 days.

(21) Appl. No.: 15/625,556

(22) Filed: Jun. 16, 2017

(65) Prior Publication Data
US 2018/0367519 A1    Dec. 20, 2018

(51) Int. Cl.
*H04L 29/06*       (2006.01)
*G06Q 30/00*       (2012.01)
(Continued)

(52) U.S. Cl.
CPC ............. *H04L 63/08* (2013.01); *G06Q 10/00* (2013.01); *G06Q 10/10* (2013.01); *G06Q 10/101* (2013.01);
(Continued)

(58) Field of Classification Search
CPC . G06F 3/048; H04L 63/1416; H04L 63/1441; H04L 63/1408; H04L 63/1425;
(Continued)

(56) References Cited

U.S. PATENT DOCUMENTS 7,730,143 B1 *   6/2010   Appelman ............. H04W 4/12
                                                    709/206
8,244,851 B1 *   8/2012   Postoaca ............... G06Q 50/01
                                                    709/205
(Continued)

FOREIGN PATENT DOCUMENTS

EP          2549414 A1       1/2013

OTHER PUBLICATIONS

Farrell, et al., "Socially augmenting employee profiles with people-tagging", In Proceedings of the 20th annual ACM symposium on User interface software and technology, Oct. 7, 2007, pp. 91-100.
(Continued)

*Primary Examiner* — Tae K Kim
(74) *Attorney, Agent, or Firm* — Shook, Hardy & Bacon L.L.P.

(57) ABSTRACT

A high percentage of received communications are from external entities. In response to receiving a communication from a sender associated with an entity, the entity may be authenticated and contextualized by retrieving and processing contact information for people at the entity that are directly and/or indirectly associated with a recipient of the communication. For example, contact information for people at the entity who have previously communicated with and/or are connected to the recipient or users related to the recipient, for example, may be retrieved from one or more directory services, social networks, and/or professional networks. The contact information may be processed to create corresponding contact objects, and the contact objects may be processed to create an entity object for the entity that comprises one or more connections between the recipient and the people at the entity. The entity object may be provided to the recipient for display.

20 Claims, 10 Drawing Sheets

(51) Int. Cl.
*H04L 12/58* (2006.01)
*G06Q 10/00* (2012.01)
*G06Q 10/10* (2012.01)
*G06Q 50/00* (2012.01)
*H04L 51/42* (2022.01)
*H04L 51/00* (2022.01)
*H04L 51/52* (2022.01)

(52) U.S. Cl.
CPC ............ *G06Q 30/01* (2013.01); *H04L 51/12* (2013.01); *H04L 51/22* (2013.01); *H04L 51/32* (2013.01); *G06Q 50/01* (2013.01)

(58) Field of Classification Search
CPC ... H04L 63/1483; H04L 63/20; H04L 63/101; H04L 63/104; H04L 63/14; H04L 51/32; H04L 51/12; G06Q 50/01
See application file for complete search history.

(56) References Cited

U.S. PATENT DOCUMENTS

| | | | |
|---|---|---|---|
| 8,856,662 B2 | 10/2014 | Becker et al. | |
| 10,445,381 B1* | 10/2019 | Gharmalkar | H04L 51/22 |
| 11,044,267 B2* | 6/2021 | Jakobsson | H04L 63/123 |
| 2003/0167324 A1* | 9/2003 | Farnham | G06Q 10/10 |
| | | | 709/224 |
| 2004/0255122 A1* | 12/2004 | Ingerman | G06Q 10/107 |
| | | | 713/176 |
| 2005/0076241 A1* | 4/2005 | Appelman | H04L 51/12 |
| | | | 726/4 |
| 2005/0171954 A1* | 8/2005 | Hull | H04L 51/32 |
| 2005/0246420 A1* | 11/2005 | Little, II | G06Q 10/107 |
| | | | 709/204 |
| 2006/0031313 A1* | 2/2006 | Libbey | G06Q 10/107 |
| | | | 709/206 |
| 2009/0319288 A1* | 12/2009 | Slaney | G06Q 10/10 |
| | | | 705/1.1 |
| 2010/0191844 A1 | 7/2010 | He et al. | |
| 2010/0318611 A1* | 12/2010 | Curtin | G06F 16/00 |
| | | | 709/206 |
| 2011/0145719 A1 | 6/2011 | Chen et al. | |
| 2012/0167174 A1* | 6/2012 | Saxena | H04L 29/00 |
| | | | 726/3 |
| 2013/0007029 A1* | 1/2013 | Ziemann | G06F 16/00 |
| | | | 707/758 |
| 2013/0013682 A1* | 1/2013 | Juan | G06Q 50/01 |
| | | | 709/204 |
| 2013/0097529 A1* | 4/2013 | Postoaca | G06Q 50/01 |
| | | | 715/753 |
| 2013/0317883 A1* | 11/2013 | Becker | G06Q 10/10 |
| | | | 705/7.29 |
| 2014/0195549 A1 | 7/2014 | Ahn et al. | |
| 2015/0244587 A1 | 8/2015 | Akavaram et al. | |
| 2016/0014070 A1* | 1/2016 | Adkins | H04L 51/12 |
| | | | 709/206 |
| 2016/0014151 A1* | 1/2016 | Prakash | H04L 63/1483 |
| | | | 726/22 |
| 2017/0169037 A1* | 6/2017 | Qu | G06F 3/0484 |

OTHER PUBLICATIONS

"International Search Report and Written Opinion Issued in PCT Application No. PCT/US18/033064", dated Jul. 2, 2018, 11 Pages.
"Office Action Issued in European Patent Application No. 18729249.5", dated Sep. 23, 2021, 6 Pages.

* cited by examiner

EXTERNAL CONTACT CONNECTIONS TO AUTHENTICATE AND CONTEXTUALIZE ENTITY

BACKGROUND

Within a communication service, a high percentage of emails received by a user may be from external entities, such as organizations, businesses, and other similar groups, both in consumer and in enterprise. In one scenario, a user may have no previous contact or connection with a sender and/or an entity with which the sender is associated with, and thus may want to authenticate the sender (especially if the sender is an alias associated with the entity). In another scenario, a user may have a previous contact or a connection with a sender associated with an entity, but the user may want to determine other people at the entity whom the user or persons related to the user have a previous contact or connection with to contextualize their relationship with the entity. In a further scenario, a user communicating for a first time with an entity may desire to determine any persons related to the user who may have contacts or connections with people at the entity to facilitate with the initial communication.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing external contact connections. A communication may be received at a communication service of a recipient from a sender associated with an external entity. Contact information for people at the external entity who are associated with the recipient may be retrieved from a directory service associated with the communication service, a social network, and/or a professional network. The retrieved contact information may be processed to create corresponding contact objects, and the contact objects may be processed to create an entity object for the external entity that comprises one or more connections between the recipient and the people at the external entity. The entity object may be provided to the recipient for display.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
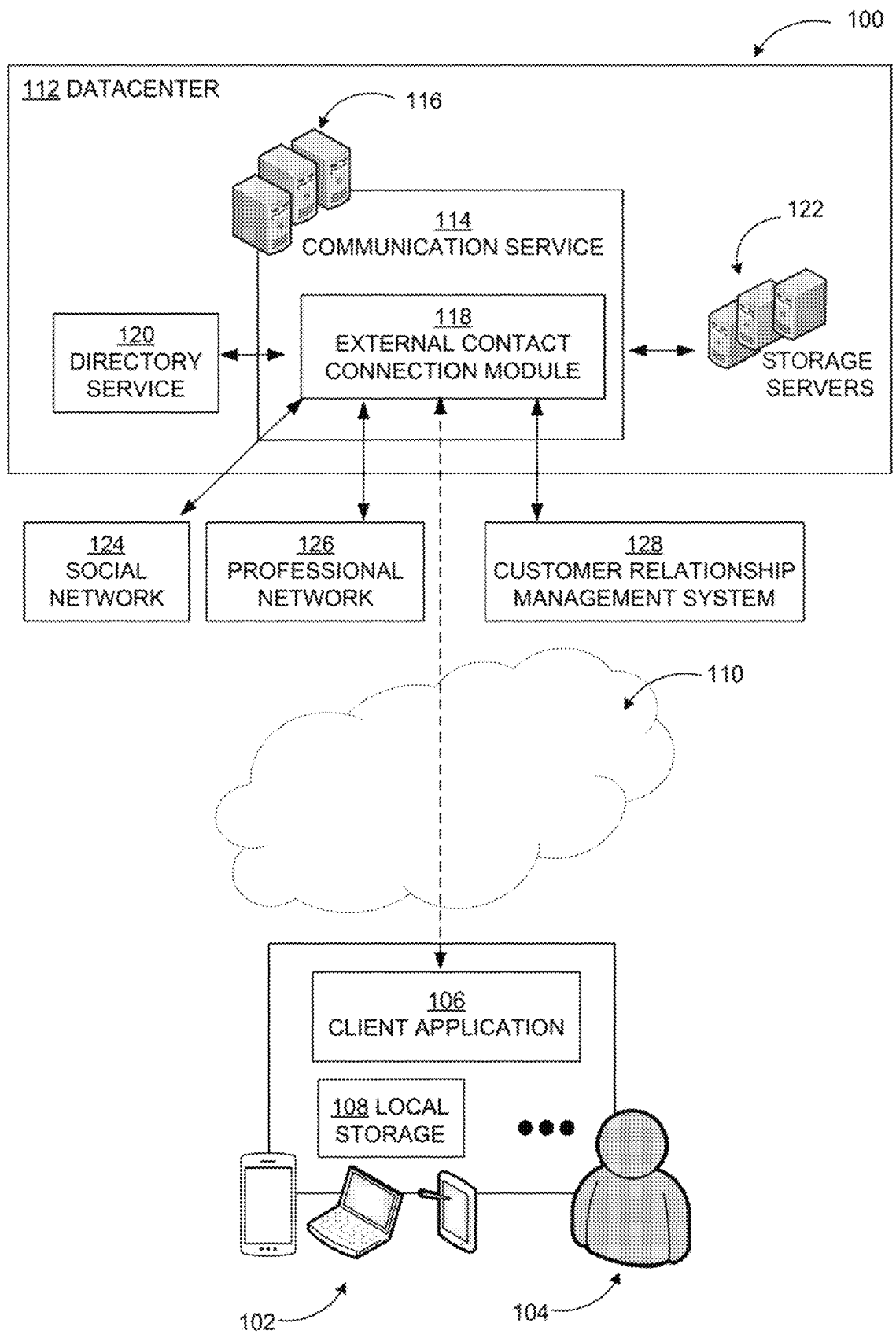
FIG. 1 includes a display diagram illustrating an example network environment where a system to provide external contact connections may be implemented.

As briefly described above, embodiments are directed to providing external contact connections. A communication may be received at a communication service of a recipient from a sender associated with an external entity. The sender may be a person, a group/team, or an alias associated with the external entity and the external entity may be an organization, a business, a company, a firm, an enterprise, or other similar body, for example. Contact information for people at the external entity who are associated with the recipient may be retrieved from a directory service associated with the communication service, a social network, and/or a professional network. The retrieved contact information may be processed to create corresponding contact objects, and the contact objects may be processed to create an entity object for the external entity that comprises one or more connections between the recipient and the people at the external entity. The connections may include people at the external entity who have communicated with the recipient and/or peers, colleagues, associates or other similar users related to the recipient through the communication service, and people at the external entity who are connected with the recipient and/or the peers, colleagues, associates or other similar users related to the recipient through the social network and the professional network. The entity object may be provided to the recipient for display as an external contact connection card. Through the external contact connection card, the recipient may be allowed to contact the people at the external entity through various communication modes, as well as to view conversations, recent documents, and/or photos associated with the people at the external entity.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for providing external contact connections. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 includes a display diagram illustrating an example network environment where a system to provide external contact connections may be implemented.

As illustrated in a diagram 100, an example system may include a datacenter 112 executing a communication service 114 on at least one processing server 116, which may enable users to create, edit, and transmit/receive communications through various communication modes, such as email, instant messaging, online conferencing, and other similar modes. The communication service 114 may be configured to interoperate with a client application 106 through one or more client devices 102 over one or more networks, such as network 110. The client devices 102 may include a desktop computer, a laptop computer, a tablet computer, a vehicle-mount computer, a smart phone, or a wearable computing device, among other similar devices. In some examples, the communication service 114 may allow users to access its services through the client application 106 executed on the client devices 102. In other examples, the communication service 114 may be provided to a tenant (e.g., a business, an organization, or similar entities), which may configure and manage the services for their users. The communications and other data associated with the communications may be stored locally in local storage 108 of the client devices 102 and/or remotely in storage servers 122 of the datacenter 112.

In one embodiment, as illustrated in diagram 100, the processing server 116 may be operable to execute an external contact connection module 118 of the communication service 114 to provide external contact connections, where the external contact connection module 118 may be integrated with the communication service 114. In another embodiment, the client application 106 may be operable to execute the external contact connection module 118, where the external contact connection module 118 may be integrated with the client application 106. In a further embodiment, the external contact connection module 118 may be a separate service configured to serve the communication service 114 and/or multiple applications associated with the communication service 114, such as the client application 106. As described herein, the communication service 114 and the external contact connection module 118 may be implemented as software, hardware, or combinations thereof.

In an example embodiment, a user 104 may receive a communication from a sender associated with an external entity through the communication service 114. The sender may be a person, a team, a group, or an alias associated with the external entity, and the external entity may be an organization, a business, a company, a firm, an enterprise, or other similar body, for example. The external contact connection module 118 may be configured to retrieve contact information for people at the external entity who are directly and/or indirectly associated with the user 104 from one or more internal and external data sources. Similar to the sender, the people at the external entity who are directly and/or indirectly associated with the user 104 may be persons, groups, teams, and/or aliases associated with the external entity.

The internal and/or data sources may include a directory service 120 of the communication service 114, a social network 124, and/or a professional network 126, for example. The directory service 120 may be a shared information infrastructure for locating, managing, administering and organizing everyday items and resources of the tenant of the communication service 114, which can include data, folders, files, users, groups, devices, contact information and other objects. The social network 126 may be a service that allows users to build social networks or social relations with other users who share similar personal or career interests, activities, backgrounds or real-life connections, for example. The professional network 126 may be a type of social network service that is focused solely on interactions and relationships of a business nature rather than including personal, nonbusiness interactions.

In some embodiments, the external contact connection module 118 may also be configured to interact with a customer relationship management (CRM) system 128 configured to, among other things, manage an entity's interaction with current and potential customers by compiling and analyzing data from a range of different communication channels, including the entity's website, telephone, email, live chat, marketing materials, and sites on social networks and/or professional networks. The CRM system 128 may be associated with a tenant of the communication service 114 itself (e.g., an entity with which the recipient is associated) or it may be associated with the external entity. In some examples, contact information for people at the external entity who are directly and/or indirectly associated with the user 104 may be retrieved from the CRM system 128. Additionally, external contact connections determined by processing the retrieved contact information, as described in detail below, may be provided to the CRM system 128 for its data analysis.

The external contact connection module 118 may be configured to process the retrieved contact information to create corresponding contact objects. The contact objects may include primary contact objects and secondary contact objects. Primary contact objects may represent people at the external entity who are directly associated with the user 104. For example, people who have previously communicated or are connected with the user 104 through the communication service 114, the social network 124, and/or the professional network 126. Secondary contact objects may represent people at the external entity who are indirectly associated with the user 104. For example, people who have previously communicated or are connected with peers, colleagues, associates, or other similar persons related to the user 104 through the communication service 114, the social network 124, and/or the professional network 126.

The external contact connection module 118 may be configured to process the contact objects to create an entity object for the external entity that comprises one or more connections between the user 104 and the people at the external entity. The connections may be primary connections comprised of the processed primary contact objects and/or secondary connections comprised of the processed secondary contact objects. The external contact connection module 118 may be configured to provide the entity object to the user 104 through a user interface of the client application 106.

In some examples, the entity object may be provided for display as an external contact connection card. Through the external contact connection card, the user 104 may be allowed to contact the people at the external entity through one or more communication modes. Additionally, the user 104 may be allowed to view one or more of conversations, recent documents, and photos associated with the people at the external entity.

As previously discussed, a high percentage of received emails are from external entities. Thus, embodiments described herein are provided to authenticate and contextualize an external entity by retrieving and processing contact information for people at the entity that are directly and/or indirectly associated to a recipient of the communication. For example, an entity object for the external entity comprising one or more connections between the recipient and people at the external entity may be created based on the processed information.

If the recipient has not had previous contact with the sender of the communication and/or the external entity, previous communications and connections between peers, colleagues, associates, or other similar persons related to the recipient and people at the external entity may be revealed as secondary connections within the entity object. The presence of these secondary connections may help to authenticate the external entity, assuring the recipient that the communication received from the external entity isn't a phishing email, for example. Additionally, these secondary connections may be a useful tool when starting to communicate with the external entity. For example, the recipient may use the knowledge of a secondary connection between a colleague and people at the external entity to get a referral from the colleague and/or to mention them in the initial communication with the external entity.

If the recipient has previously communicated with people at the external entity, the previous communications in addition to connections between the recipient and the people at the external entity within professional and/or social networks may be primary connections within the entity object. Additionally, any previous communications and connections between peers, colleagues, associates, or other similar persons related to the recipient and people at the external entity may be revealed as secondary connections within the entity object. These primary and secondary connections may allow the recipient to see all people at the entity to whom the recipient and persons related to the recipient have a previous communication or connection with to contextualize their relationship with the external entity.

Moreover, by displaying the entity object as an external contact connection card that serves as a map of all people at the entity with whom the recipient has either a primary or secondary connection to, user efficiency in communicating with the external entity may be increased. Additionally, user interactivity may be improved as the recipient may be allowed to contact the people at the external entity via one or more communication modes, and view one or more of conversations, recent documents, and photos associated with the people at the external entity through the external contact connection card.

Embodiments, as described herein, address a need that arises from a very large scale of operations created by software-based services that cannot be managed by humans. The actions/operations described herein are not a mere use of a computer, but address results of a system that is a direct consequence of software used as a service offered in conjunction with a large number of users consuming communication services to transmit/receive communications, where a high percentage of those communications are transmitted by external entities.

Figure 2:
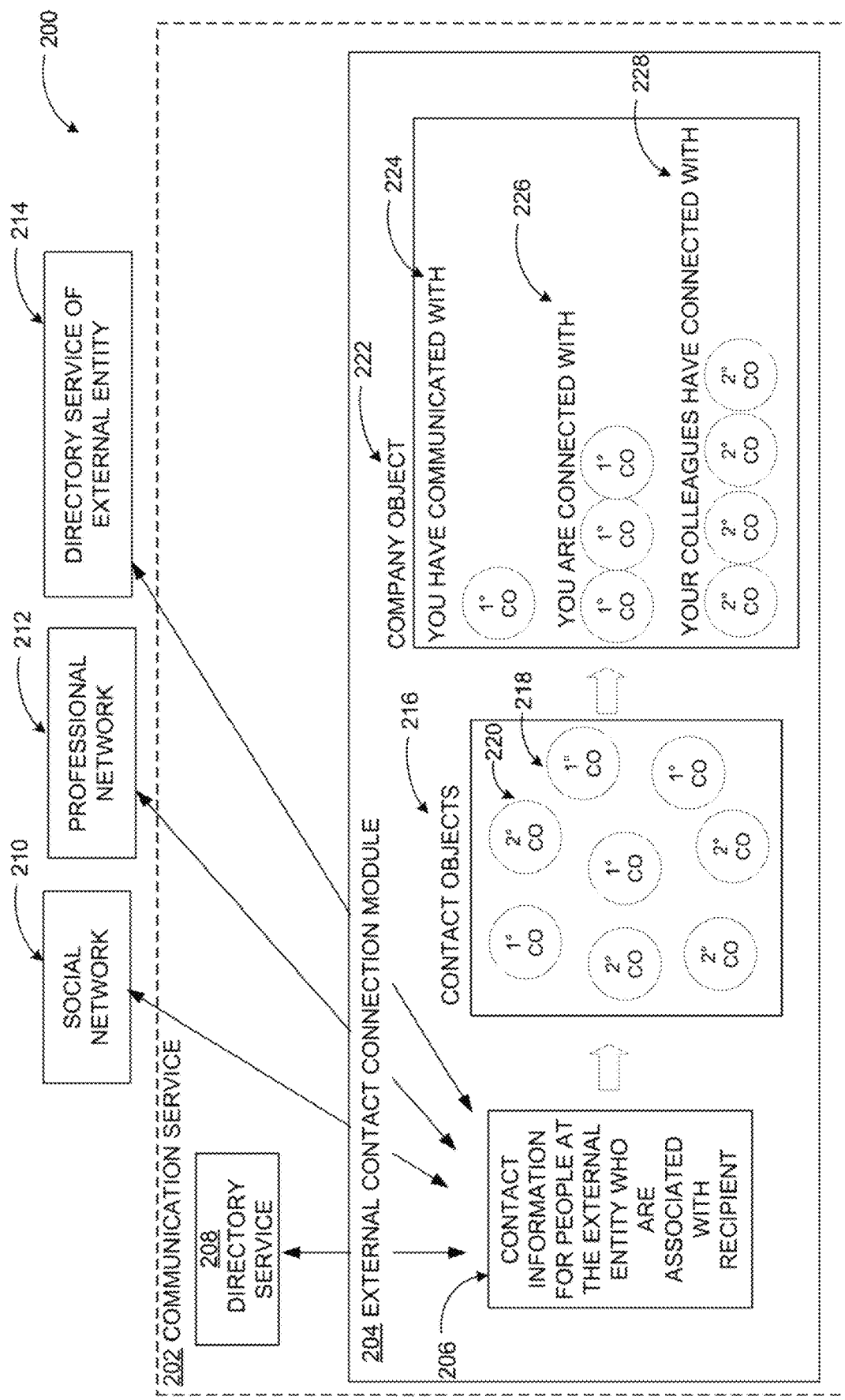
FIG. 2 includes a display diagram illustrating conceptually an example set of actions and components for providing external contact connections.

FIG. 2 includes a display diagram illustrating conceptually an example set of actions and components for providing external contact connections.

As shown in a diagram 200, a communication service 202 configured to transmit and receive communications, among other actions, may include an external contact connection module 204 configured to provide external contact connections in response to receipt of a communication from a sender that is associated with an external entity. In one example, the external contact connection module 204 may be configured to retrieve contact information 206 for people at the external entity who are associated with a recipient of the communication (i.e., a user to whom the communication service 202 is provided) from a directory service 208 of the communication service 202, a social network 210, and/or a professional network 212. In some examples, if the external entity has chosen to publish or otherwise make the external entity's directory service 214 legally accessible, contact information 206 may also be retrieved from the external entity's directory service 214. The contact information 206 retrieved for each of the people at the external entity who are associated with the recipient may include a name, a telephone number, an email address, an instant messaging address, a position or title at the external entity, a photograph, and data/metadata associated with previous communications or connections with the recipient or other users related to the recipient, among other similar information and dependent on which source the contact information was retrieved from.

The external contact connection module 204 may be configured to process the retrieved contact information 206 to create corresponding contact objects 216. The contact objects 216 may include primary contact objects 218 and secondary contact objects 220. Primary contact objects 218 may represent people at the external entity who are directly associated with the recipient. For example, people who have communicated or are connected with the recipient through the communication service 202, the social network 210 and/or the professional network 212. Secondary contact objects 220 may represent people at the external entity who are indirectly associated with the recipient. For example, people who have communicated or are connected with peers, colleagues, associates, or other similar persons related to the recipient through the communication service 202, the social network 210, and/or the professional network 212.

The external contact connection module 204 may be configured to process the contact objects 216 to create an entity object 222 for the external entity that comprises one or more connections 224, 226, 228 between the recipient and the people at the external entity. For example, to process the contact objects 216, the external contact connection module 204 may be configured to filter the contacts objects 216 to separate the primary contact objects 218 and the secondary contact objects 220. In some embodiments, if one or more of the secondary contact objects 220 represent a same contact as one or more primary contact objects 218, the external contact connection module 204 may be configured to remove the respective secondary contact objects 220 to prevent duplicate data. The external contact connection module 204 may then be configured to create the entity object 222, where the one or more connections 224, 226, 228 between the recipient and the external entity are presented based on a type of connection between the recipient and the external entity.

The types of connections may be primary connections 224, 226 comprised of the processed primary contact objects 218 and/or secondary connections 228 comprised of the processed secondary contact objects 220. For example, the primary connections 224, 226 may include people who have communicated with the recipient before through the communication service 202 (i.e., primary connection 224) and people who are connected with the recipient through the social network 210 and/or professional network 212 (i.e., primary connection 226). The secondary connections 228 may include people who are connected with peers, colleagues, associates, or other similar persons related to the recipient through the social network 210, and/or professional network 212.

The external contact connection module 204 may be configured to provide the entity object 222 to the recipient, where the entity object may be displayed as an external contact connection card. The external contact connection card may group the people based on the type of connection they have with the recipient, as described above. At least some of the contact information retrieved for each of the people, including a name, a photo, and/or a title at the external entity, for example, may be displayed in conjunction with a respective connection. Through the external contact connection card, the recipient may be allowed to contact the people at the external entity through various communication modes. Additionally, the recipient may be allowed to view one or more of conversations, recent documents, and photos associated with the people at the external entity.

Figure 3A:
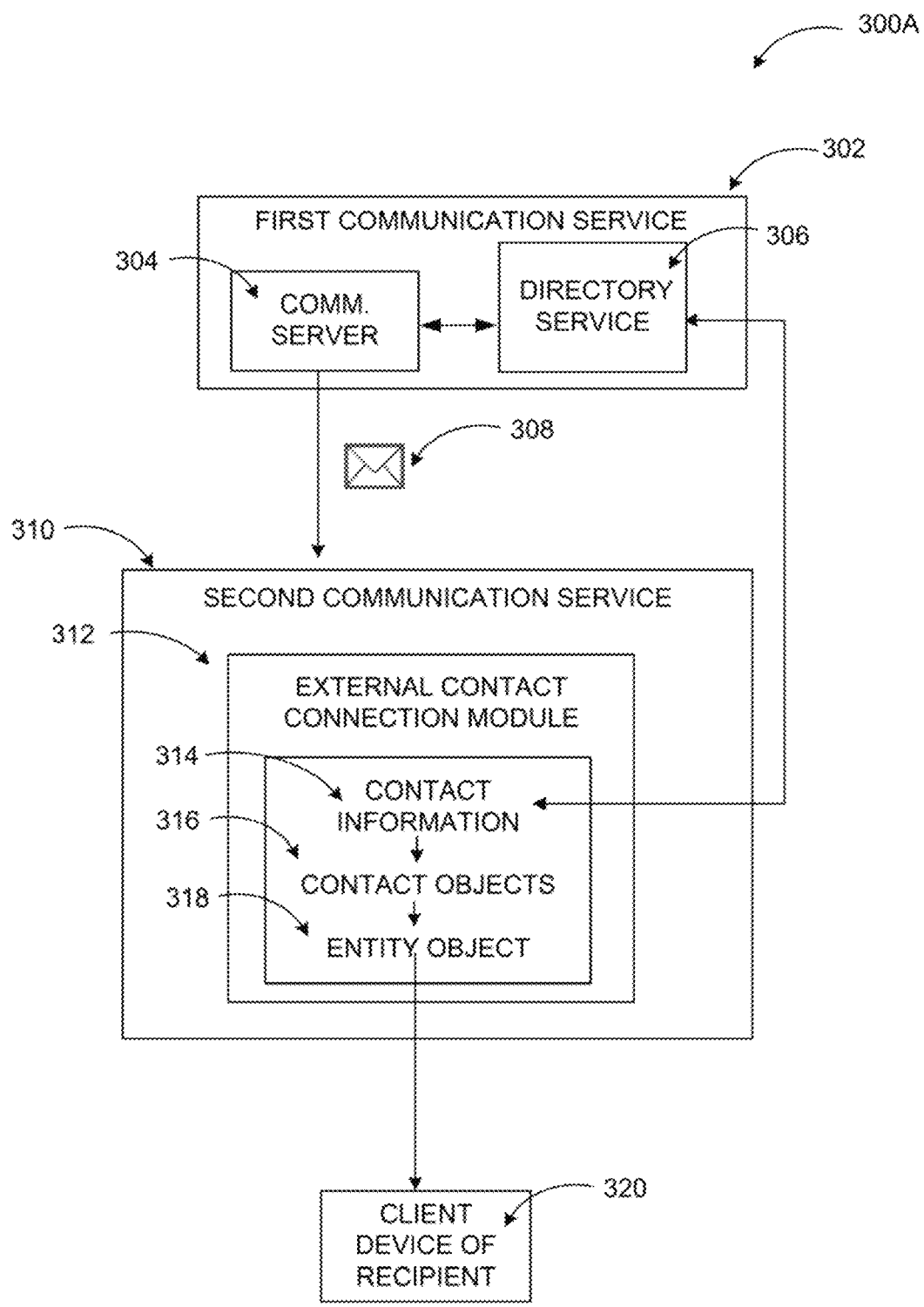
FIGS. 3A through 3C include display diagrams illustrating example scenarios in which contact connections for an external entity are provided in response to receiving a communication from a sender associated with the external entity.
Figure 3B:
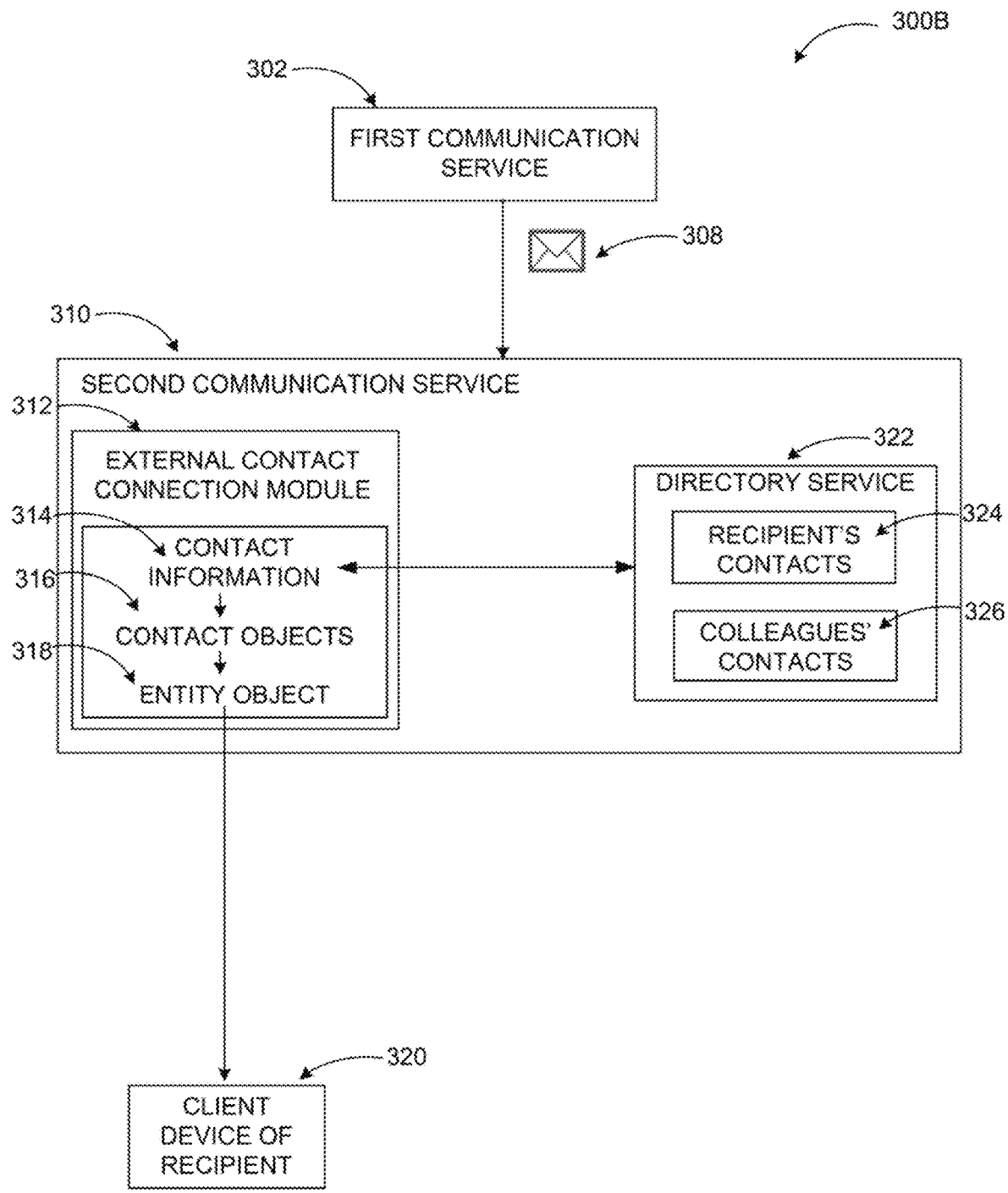
Figure 3C:
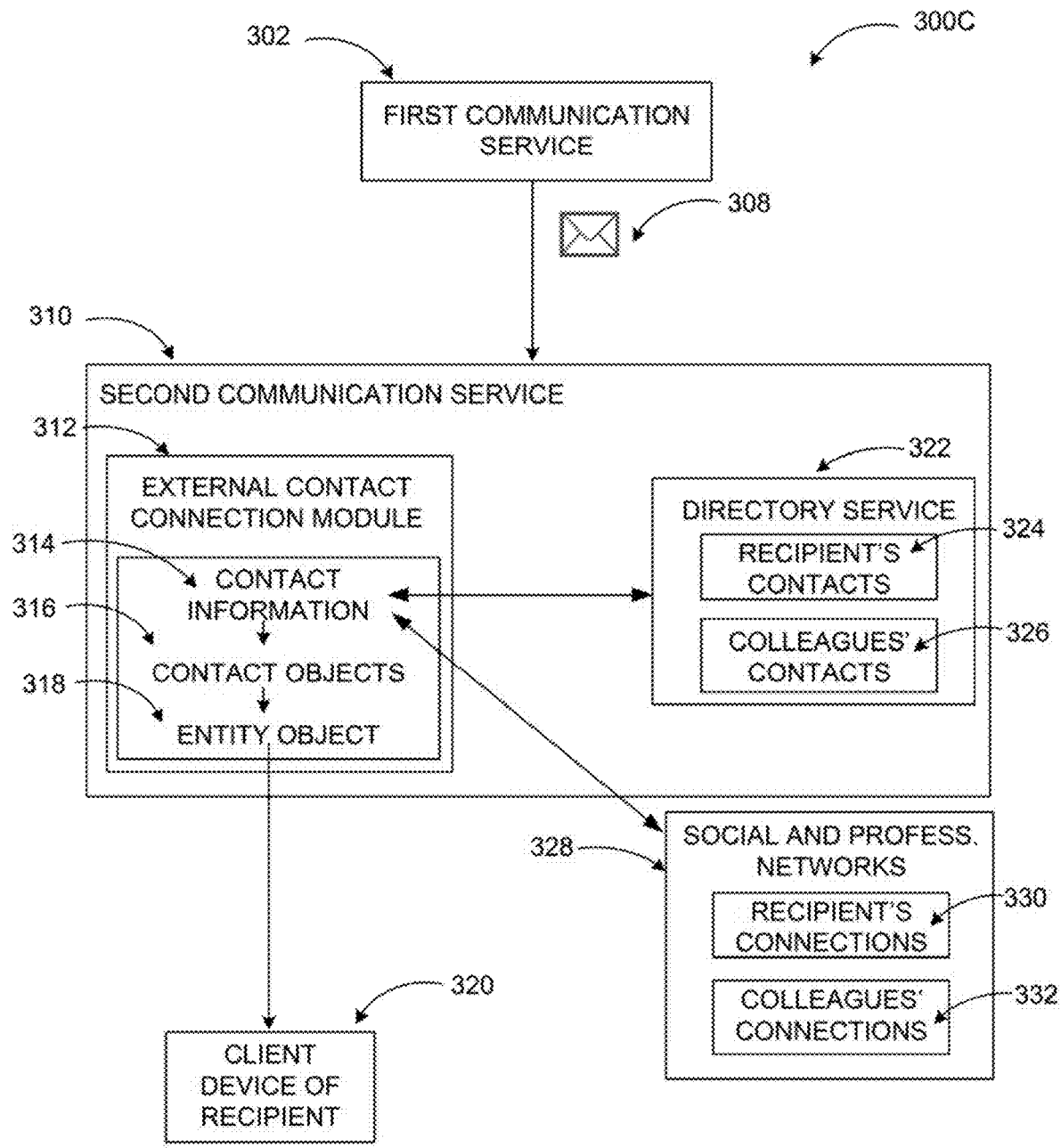

FIGS. 3A through 3C include display diagrams illustrating example scenarios in which contact connections for an external entity are provided in response to receiving a communication from a sender associated with the external entity.

As shown in diagrams 300A through 300C, a communication server 304 of a first communication service 302 that is associated with an external entity may be configured to transmit a communication, such as an email 308, from a sender associated with the external entity to a recipient at a second communication service 310. The second communication service 310 may itself be associated with an entity (e.g., an internal entity) and may include an external contact connection module 312. The external contact connection module 312 may be configured to provide external contact connections to the recipient in response to receipt of the email 308 from the first communication service 302.

For the following scenarios, the internal entity may be a business corporation, the recipient may be a manager for a recruiting department of the business corporation, the external entity may be a recruiting agency, and the sender may be an alias from the external recruiting agency (e.g., the email 308 may be received from services@werecruit4you.com). Initially, the manager may be wary of the email 308 as it sent from an alias rather than a person and the recruiting agency may be an external entity with which the manager is less familiar with. However, one way to authenticate and contextualize the recruiting agency may be through the people who are associated with the recruiting agency and their direct and/or indirect relationships to the manager. These relationships or external contact connections may be determined and provided for display to the manager by implementing the external contact connection module 312 as described in one or more of the following scenarios.

As shown in diagram 300A of FIG. 3A, the email 308 may be sent from a communication server 304 within the first communication service 302. Upon receipt at the second communication service 310, the external contact connection module 312 may be configured to retrieve contact information 314 for people at the recruiting agency. The contact information 314 may be retrieved from a directory service 306 of the first communication service 302 that has been made public or at least legally accessible to the second communication service 310. The directory service 306 may be a shared information infrastructure for locating, managing, administering and organizing everyday items and resources of the recruiting agency, which can include data, folders, files, users, groups, devices, contact information and other objects. Any contact information made available for discovery and retrieval within the directory service 306 may be retrieved. In one example, contact information for all people at the recruiting agency may be retrieved. In another example, contact information for only a limited number of people may be retrieved, such as contact information for directors for each department of the external entity.

The external contact connection module 312 may process the retrieved contact information 314 to create contact objects 316, where the contact objects may include primary contact objects and/or secondary contact objects. The primary contacts may represent people at the recruiting agency who have communicated previously with the manager and secondary contact objects may represent people at the recruiting agency who have communicated previously with other persons associated with the business corporation, such as colleagues of the manager. The external contact connection module 312 may then process the contact objects 316 to create an entity object 318 for the recruiting agency that comprises one or more connections between the manager and the people at the recruiting agency. The connections may be primary connections comprised of the processed primary contact objects and/or secondary connections comprised of the processed secondary contact objects.

The external contact connection module 312 may be configured to provide the entity object 318 for display to the manager. For example the entity object 318 may be displayed through a user interface of a communication application associated with the second communication service 310 that is executing on a client device 320. In some examples, the entity object 318 may be provided as an external contact connection card. Through the external contact connection card, the manager may be allowed to contact the people at the recruiting agency whom the he or she has connections with through one or more communication modes, as well as to view one or more of conversations, recent documents, and photos associated with the people at the external entity.

Alternatively, as shown in diagram 300B of FIG. 3B, if the directory service 306 of the first communication service 302 has not been made public or legally accessible to the second communication service 310, the contact information 314 may be retrieved from a directory service 322 of the second communication service 310. The directory service 322 may be a shared information infrastructure for locating, managing, administering and organizing everyday items and resources of the business corporation, which can include data, folders, files, users, groups, devices, contact information and other objects. The retrieved contact information 314 may include contact information for people at the recruiting agency who have communicated previously with the manager (e.g., recipient's contacts 324) or any other person associated with the business corporation, such as the manager's colleagues (e.g., colleague's contacts 326).

The external contact connection module 312 may process the retrieved contact information 314 to create corresponding contact objects 316, where the contact objects may include primary contact objects and/or secondary contact objects. The primary contact objects may represent people at the recruiting agency who have communicated previously with the manager. The secondary contact objects may represent people at the recruiting agency who have communicated previously with other persons associated with the business corporation who are related to the manager, such as peers, colleagues, and associates. The external contact connection module 312 may then process the contact objects 316 to create an entity object 318 for the recruiting agency that comprises one or more connections between the manager and the people at the recruiting agency. The connections may be primary connections comprised of the processed primary contact objects and/or secondary connections comprised of the processed secondary contact objects. The external contact connection module 312 may be configured to provide the entity object 318 for display to the manager through the user interface of the communication application associated with the second communication service 310 that is executing on the client device 320.

As shown in diagram 300C of FIG. 3C, in addition to the directory service 322, the contact information 314 may be retrieved from social and/or professional networks 328. The social and/or professional networks 328 may be services that allows users to build interactions and relationships of a social or business nature, respectively. Therefore, contact information for people at the recruiting agency who are connected with the manager (e.g., recipient's connections 330) or any other person associated with the business corporation, such as the manager's colleagues (e.g., colleagues' connections 332), through the social and/or professional networks 328 may be retrieved in addition to the contact information for people at the recruiting agency who previously communicated with the manager or other persons associated with the business corporation.

The external contact connection module 312 may process the retrieved contact information 314 to create corresponding contact objects 316, where the contact objects may include primary contact objects and/or secondary contact objects. The primary contacts may represent people at the recruiting agency who have communicated previously with the manager or are connected with the manager through the social and/or professional networks 328. The secondary contact objects may represent people at the recruiting agency who have communicated previously with other persons associated with the business corporation or are connected with those other persons through the social and/or professional networks 328. The external contact connection module 312 may then process the contact objects 316 to create an entity object 318 for the recruiting agency that comprises one or more connections between the manager and the people at the recruiting agency. The connections may be primary connections comprised of the processed primary contact objects and/or secondary connections comprised of the processed secondary contact objects. The external contact connection module 312 may be configured to provide the entity object 318 for display to the manager through the user interface of the communication application associated with the second communication service 310 that is executing on the client device 320.

Figure 4:
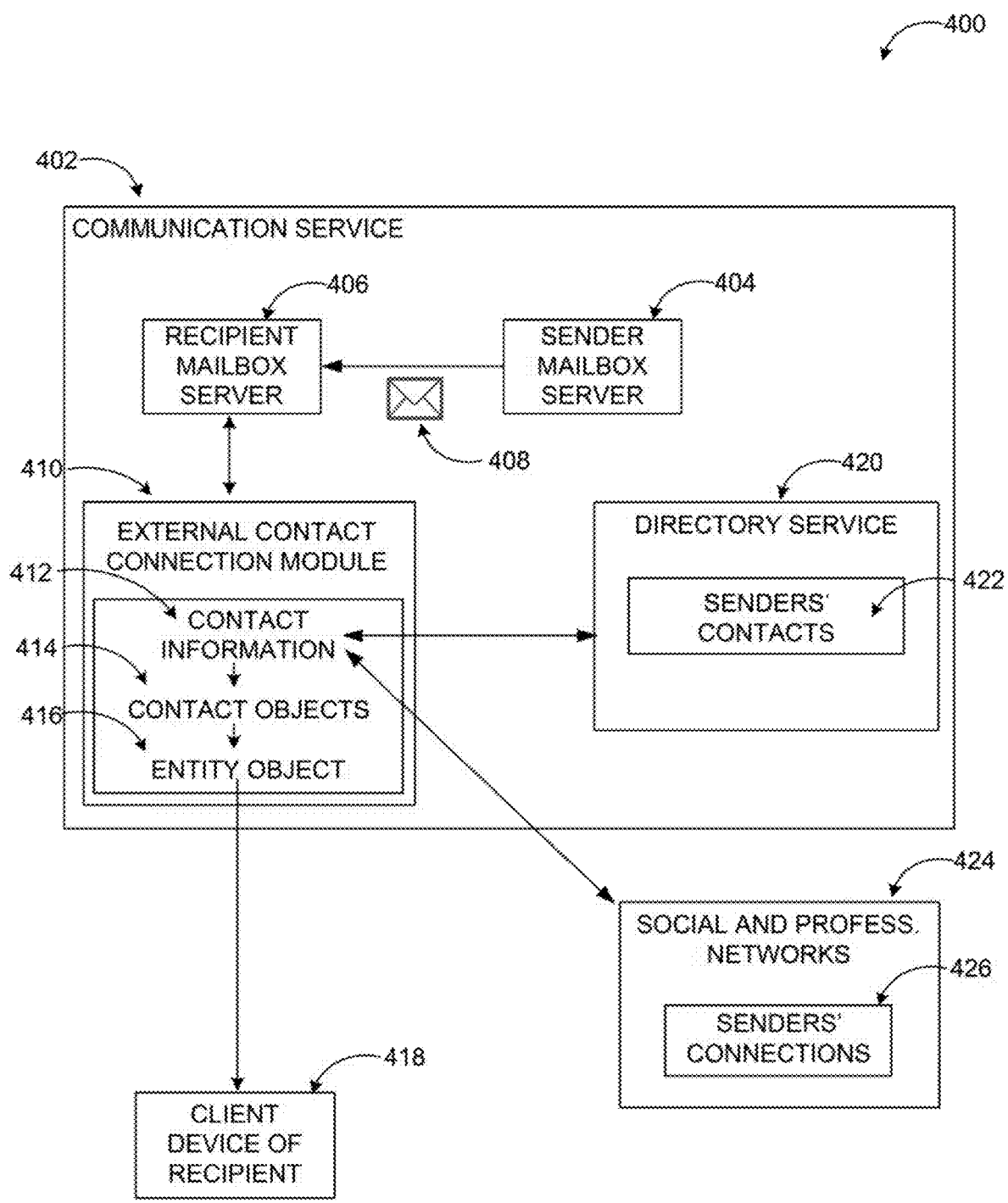
FIG. 4 includes a display diagram illustrating an example scenario in which contact connections for an external entity are provided in response to receiving an internal communication from a sender associated with a same entity as a recipient that interacts with the external entity.

FIG. 4 includes a display diagram illustrating an example scenario in which contact connections for an external entity are provided in response to receiving an internal communication from a sender associated with a same entity as a recipient that interacts with the external entity.

As shown in a diagram 400, a communication service 402 associated with a first entity may be provided to a tenant (e.g., the first entity), which may configure and manage the services for their users. The communication service 402 may comprise a plurality of mailbox servers, including a sender mailbox server 404 and a recipient mailbox server 406, configured to transmit and receive communications between the users, among other actions. The communication service 402 may also include an external contact connection module 410 configured to provide external contact connections to a recipient in response to receipt of an internal communication from within the communication service 402, where a sender of the email is associated with the same first entity as a recipient and interacts with a second, external entity. For example, in response to a receipt of an email 408 at the recipient mailbox server 406 that was transmitted from the sender mailbox server 404.

In an example scenario, the first entity may be a charitable organization, the recipient may be a development officer of the charitable organization, the sender may be a community outreach member of the charitable organization, and the second, external entity may be a multi-million dollar company with a philanthropic reputation. The development officer may wish to contact appropriate persons at the company with a goal of securing the company as a donor for the charitable organization, but the development officer may have no previous contacts with the company. Thus, it may be difficult and time consuming for the development officer to retrieve contact information of all potentially appropriate people to contact at the corporation, weed through those people to find the few who actually deal with this type of donation/gift giving, and to build a relationship with said people in order to achieve his or her goal.

A more efficient way to communicate with the corporation may be to contextualize the corporation by establishing the people at the corporation who are indirectly associated with the development officer. For example, the development officer's colleague, the community outreach member, may be responsible for reaching out to potential donors on a periodic basis through community events and the like. Through these events, the community outreach member may have previously communicated through email or connected through social or professional networks with people at the organization (and likely people at the organization who are involved with donations/gift giving). Thus, it may be beneficial for the development officer to take advantage of these previous contacts when trying to get in touch with the organization. These contact connections may be determined and provided for display to the development officer by implementing the external contact connection module 410 as described below.

Upon receipt of the email 408 at the recipient mailbox server 406 from the community outreach member, the external contact connection module 410 may be configured to retrieve contact information 412 for people at the charitable organization who are associated indirectly with the development officer through the community outreach member, for example. The contact information 412 may be retrieved from a directory service 420 of the communication service 402. For example, contact information for people at the charitable organization who previously communicated with the community outreach member (i.e., the sender's contacts 422). The contact information 412 may also be retrieved from social and/or professional networks 424. For example, contact information for people at the charitable organization who are connected with the community outreach member (i.e., the sender's connections 426) through the social and/or professional networks 424.

The external contact connection module 410 may process the retrieved contact information 412 to create corresponding contact objects 414, where the contact objects may include secondary contact objects. The secondary objects represent the people at the charitable organization who have previously communicated with the community outreach member through the communication service 402 or are connected with the community outreach member through the social and/or professional networks 424. The external contact connection module 410 may then process the contact objects 414 to create an entity object 416 for the charitable organization that comprises one or more connections between the manager and the people at the recruiting agency. The connections may be secondary connections comprised of the processed secondary contact objects. The external contact connection module 410 may be configured to provide the entity object 416 for display to the development officer through a user interface of a communication application associated with the communication service 402 that is executing on a client device 418.

Figure 5:
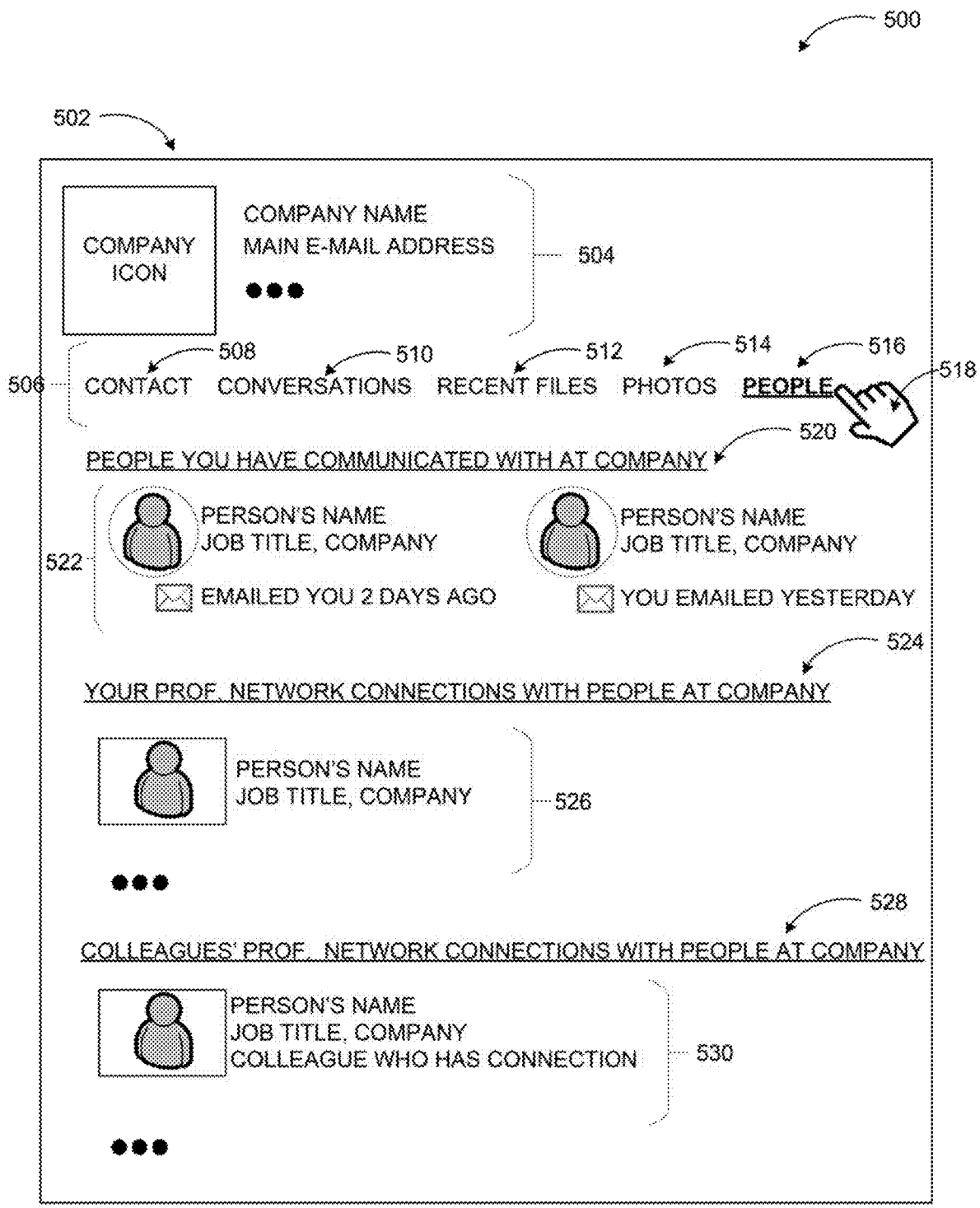
FIG. 5 includes a display diagram illustrating an example external contact connection card.

FIG. 5 includes a display diagram illustrating an example external contact connection card.

As previously discussed, an external contact connection module of a communication service may be configured to provide external contact connections in response to a receipt of a communication from a sender associated with an external entity or a sender associated with a same entity as a recipient that interacts with the external entity. For example, the external contact connection module may retrieve contact information for people at the external entity who are directly or indirectly associated with a recipient from a directory service associated with the communication service, a social network, and/or a professional network. The external contact connection module may then be configured to process the retrieved contact information to create corresponding contact objects, and process the contact objects to create an entity object for the external entity that comprises one or more connections between the recipient and the people at the external entity. The connections may be primary connections and/or secondary connections. The connection may be a primary connection if the recipient and the people at the external entity have communicated previously through the communication service and/or are connected through professional and/or social networks. The connection may be a secondary connection if a person related to the recipient, such as a peer, colleague, or associate, and the people at the external entity have communicated previously through the communication service and/or are connected through professional and/or social networks.

As shown in a diagram 500, the external contact connection module may be configured to provide the entity object for display through an external contact connection card 502. The external contact connection card 502 may serve as a map of all people at the external entity with whom the recipient has either a primary or secondary connection, which may contextualize the recipient's relationship with the external entity. The external contact connection card 502 may include basic entity information 504, such as a name, a main email address, and an icon/brand, for example, along with a tool bar 506 comprising various selectable tabs. The tabs may include a contact tab 508, a conversations tab 510, a recent files tab 512, a photos tab 514, and a people tab 516. Through the contact tab 508, the recipient may be allowed to contact the people at the external entity through various communication modes, such as email, instant messaging, online conferencing, and other similar modes. Additionally, through the conversations tab 510, the recent files tab 512, and the photos tab 514, the recipient may be allowed to view one or more of conversations, recent files, and photos associated with the people at the external entity, respectively.

In response to a selection 518 of the people tab 516, the external contact connection card 502 may display the entity object, where the connections (e.g., 520, 524, 528) between the recipient and the people at the external entity are grouped based on a type of connection. For example, primary connections 520, 524 may be grouped separately from secondary connections 528. Moreover, within each grouping, there may be sub-groups based on a type of contact that the people and the recipient had to establish the particular type of connection. For example, within the group of people having primary connections 520, 524, there may be a sub-group of people who have communicated with the recipient previously through the communication service (e.g. 520), and a sub-group of people who are connected with the recipient through a professional network (e.g., 524). The group of people having secondary connections 528 may be people who are connected with colleagues of the recipient through a professional network.

Within each of the groups or sub-groups, some of the contact information retrieved for each of the people, including a name, a photo, and/or a title at the external entity may be displayed (see elements 522, 526, 530). Additionally, within the sub-group of people who have communicated with the recipient previously through the communication service 520, an elapsed time since the previous communication and an initiator of that communication may be displayed (see element 522), and within the group of people having secondary connections 528, the colleagues with whom the people are connected through the professional network may be displayed (see element 530).

The external contact connection card 502 is not limited to the above described components and features. Various graphical, textual, coloring, shading, and visual effect schemes may be employed to provide the entity object for display.

The examples provided in FIGS. 1 through 5 are illustrated with specific systems, services, applications, and user interface displays. Embodiments are not limited to environments according to these examples. Providing external contact connections may be implemented in environments employing fewer or additional systems, services, applications, and user interface displays. Furthermore, the example systems, services, applications, and user interface displays shown in FIG. 1 through 5 may be implemented in a similar manner with other user interface or action flow sequences using the principles described herein.

Figure 6:
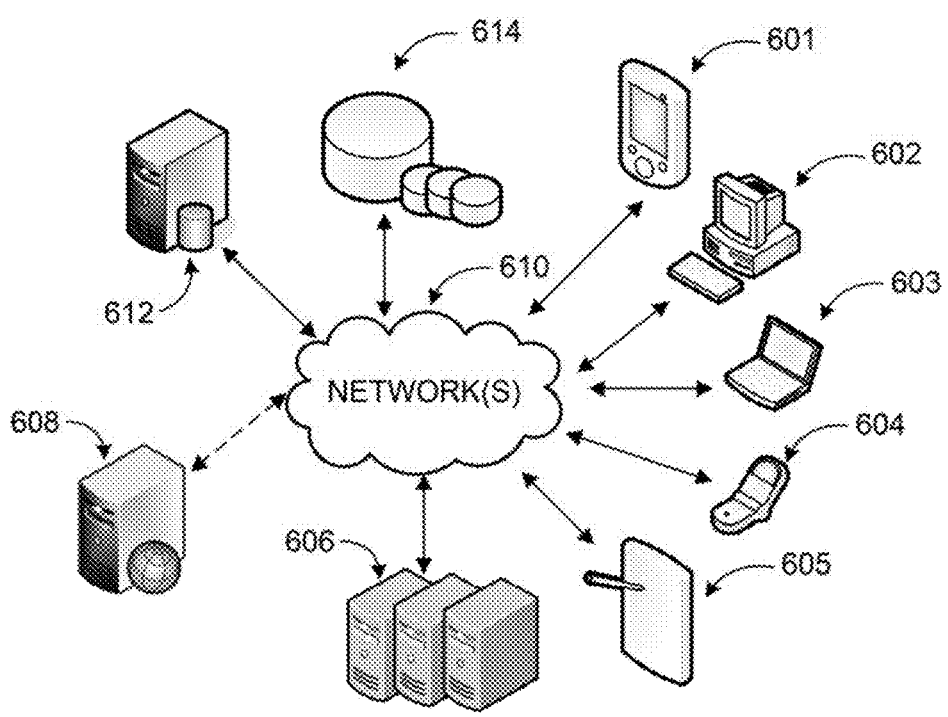
FIG. 6 is a networked environment, where a system according to embodiments may be implemented.

FIG. 6 is a networked environment, where a system according to embodiments may be implemented. An external contact connection module as described herein may be employed in conjunction with hosted applications and services (for example, the client application 106 associated with the communication service 114 or the communication service 114) that may be implemented via software executed over one or more servers 606 or individual server 608, as illustrated in diagram 600. A hosted service or application may communicate with client applications on individual computing devices such as a handheld computer 601, a desktop computer 602, a laptop computer 603, a smart phone 604, a tablet computer (or slate), 605 ('client devices') through network(s) 610 and control a user interface presented to users.

Client devices 601-605 are used to access the functionality provided by the hosted service or client application. One or more of the servers 606 or server 608 may be used to provide a variety of services as discussed above. Relevant data may be stored in one or more data stores (e.g. data store 614), which may be managed by any one of the servers 606 or by database server 612.

Network(s) 610 may comprise any topology of servers, clients, Internet service providers, and communication media. A system according to embodiments may have a static or dynamic topology. Network(s) 610 may include a secure network such as an enterprise network, an unsecured network such as a wireless open network, or the Internet. Network(s) 610 may also coordinate communication over other networks such as PSTN or cellular networks. Network(s) 610 provides communication between the nodes described herein. By way of example, and not limitation, network(s) 610 may include wireless media such as acoustic, RF, infrared and other wireless media.

Many other configurations of computing devices, applications, engines, data sources, and data distribution systems may be employed to provide external contact connections. Furthermore, the networked environments discussed in FIG. 6 are for illustration purposes only. Embodiments are not limited to the example applications, engines, or processes.

Figure 7:
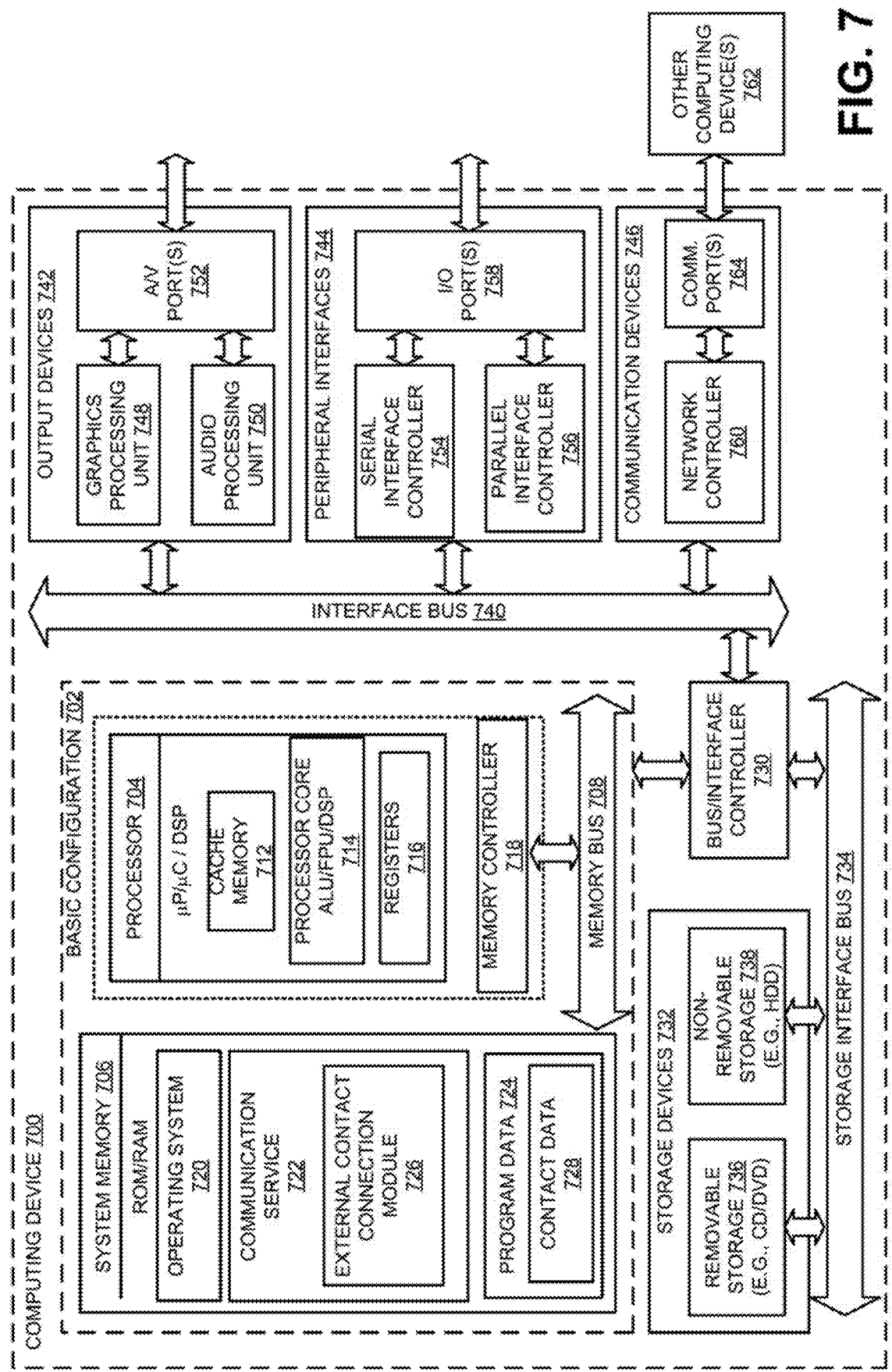
FIG. 7 is a block diagram of an example computing device, which may be used to provide external contact connections.

FIG. 7 is a block diagram of an example computing device, which may be used to provide external contact connections.

For example, computing device 700 may be used as a server, desktop computer, portable computer, smart phone, special purpose computer, or similar device. In an example basic configuration 702, the computing device 700 may include one or more processors 704 and a system memory 706. A memory bus 708 may be used for communicating between the processor 704 and the system memory 706. The basic configuration 702 is illustrated in FIG. 7 by those components within the inner dashed line.

Depending on the desired configuration, the processor 704 may be of any type, including but not limited to a microprocessor (µP), a microcontroller (µC), a digital signal processor (DSP), or any combination thereof. The processor 704 may include one more levels of caching, such as a level cache memory 712, one or more processor cores 714, and registers 716. The example processor cores 714 may (each) include an arithmetic logic unit (ALU), a floating point unit (FPU), a digital signal processing core (DSP Core), or any combination thereof. An example memory controller 718 may also be used with the processor 704, or in some implementations the memory controller 718 may be an internal part of the processor 704.

Depending on the desired configuration, the system memory 706 may be of any type including but not limited to volatile memory (such as RAM), non-volatile memory (such as ROM, flash memory, etc.) or any combination thereof. The system memory 706 may include an operating system 720, a communication service 722, and program data 724. The communication service 722 may include an external contact connection module 726, which may be an integrated module of the communication service 722. The external contact connection module 726 may be configured to receive a communication from a sender associated with an external entity, and retrieve contact information for people at the external entity who are associated with a recipient of the communication from a directory service associated with the communication service 722, a social network, and/or a professional network. The external contact connection module 726 may then be configured to process the retrieved contact information to create corresponding contact objects, process the contact objects to create an entity object for the external entity that comprises one or more connections between the recipient and the people at the external entity, and provide to be displayed the entity object to the recipient. The program data 724 may include, among other data, contact data 728, such as contact information, contact objects, and/or entity objects, as described herein.

The computing device 700 may have additional features or functionality, and additional interfaces to facilitate communications between the basic configuration 702 and any desired devices and interfaces. For example, a bus/interface controller 730 may be used to facilitate communications between the basic configuration 702 and one or more data storage devices 732 via a storage interface bus 734. The data storage devices 732 may be one or more removable storage devices 736, one or more non-removable storage devices 738, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 706, the removable storage devices 736 and the non-removable storage devices 738 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (for example, one or more output devices 742, one or more peripheral interfaces 744, and one or more communication devices 746) to the basic configuration 702 via the bus/interface controller 730. Some of the example output devices 742 include a graphics processing unit 748 and an audio processing unit 750, which may be configured to communicate to various external devices such as a display or speakers via one or more A/V ports 752. One or more example peripheral interfaces 744 may include a serial interface controller 754 or a parallel interface controller 756, which may be configured to communicate with external devices such as input devices (for example, keyboard, mouse, pen, voice input device, touch input device, etc.) or other peripheral devices (for example, printer, scanner, etc.) via one or more I/O ports 758. An example communication device 746 includes a network controller 760, which may be arranged to facilitate communications with one or more other computing devices 762 over a network communication link via one or more communication ports 764. The one or more other computing devices 762 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 700 may be implemented as a part of a general purpose or specialized server, mainframe, or similar computer that includes any of the above functions. The computing device 700 may also be implemented as a personal computer including both laptop computer and non-laptop computer configurations.

Example embodiments may also include methods to provide external contact connections. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 8:
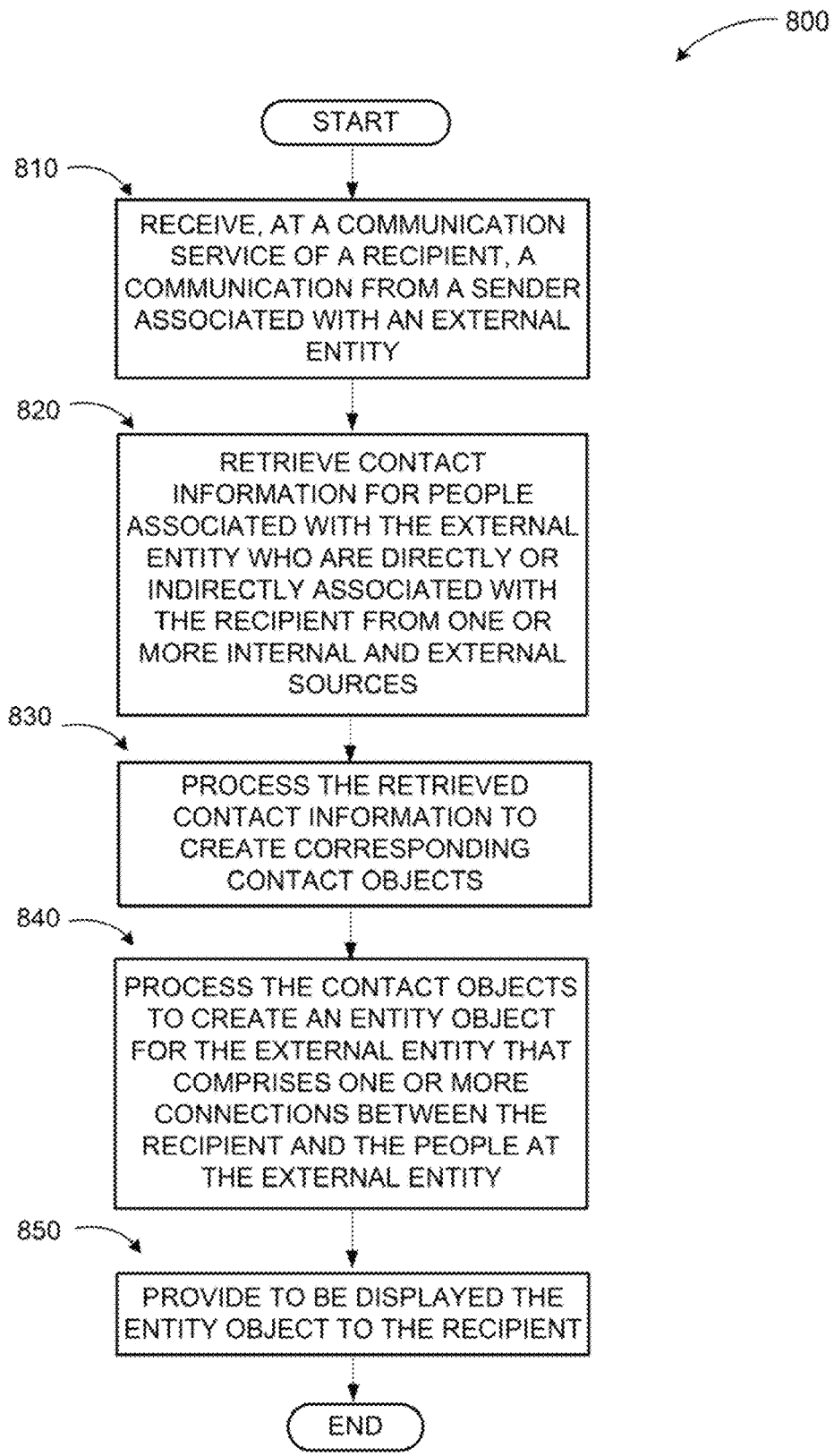
FIG. 8 illustrates a logic flow diagram of a method to provide external contact connections, arranged in accordance with at least some embodiments described herein.

FIG. 8 illustrates a logic flow diagram of a method to provide external contact connections. Process 800 may be implemented on a computing device, server, or other system. An example server configured to execute an external contact connection module associated with a communication service comprises a communication interface to facilitate communication between the server and one or more client devices, a directory service associated with the communication service, and/or one or more professional and/or social networks. The example server may also comprise a memory to store instructions, and one or more processors coupled to the memory. The processors, in conjunction with the instructions stored on the memory, may be configured to provide external contact connections.

Process 800 begins with operation 810, where the processors may be configured to receive a communication at the communication service from a sender associated with an external entity. The sender may be a person, a group, a team, or an alias associated with the external entity and the external entity may be organization, a business, a company, a firm, an enterprise, or other similar body.

At operation 820, the processors may be configured to retrieve contact information for people at the external entity who are directly or indirectly associated with a recipient of the communication from one or more internal and external sources, such as a directory service associated with the communication service, a social network, and/or a professional network. In some embodiments, if the external entity has made their directory public or legally accessible, the contact information may also be retrieved from the directory service of the external entity. In further embodiments, the contact information may also be retrieved from a CRM system that is associated with either a tenant of the communication service or the external entity. Similar to the sender, the people at the external entity may be persons, groups, teams, and/or aliases associated with the external entity. The contact information retrieved for each of the people may include a name, a telephone number, an email address, an instant messaging address, a position or title at the external entity, a photograph, and data/metadata associated with previous communications or connections with the recipient or other users related to the recipient, among other similar information and dependent on which source the contact information was retrieved from.

At operation 830, the processors may be configured to process the retrieved contact information to create corresponding contact objects. The contact objects may include primary contact objects that represent contact information for the people at the external entity who are directly associated with the recipient and secondary contact objects that represent contact information for the people at the external entity who are indirectly associated with the recipient (e.g., people who are associated with peers, colleagues, associates, or other similar persons related to the recipient).

At operation 840, the processors may be configured to process the contact objects to create an entity object for the external entity that comprises one or more connections between the recipient and the people at the external entity. For example, the contacts objects may be filtered to separate the primary contact objects and the secondary contact objects, and in some embodiments, one or more of the secondary contact objects may be remove in response to a determination that one or more of the primary contact objects represent a same contact. The entity object may then be created to present the one or more connections between the recipient and the external entity based on a type of connection between the recipient and the external entity. The connections may be primary connections comprised of the processed primary objects and/or secondary connections comprised of the processed secondary objects.

At operation 850, the processors may be configured to provide the entity object for display to the recipient. In some examples, the entity object may be provided as an external contact connection card. Through the external contact connection card, the recipient may be allowed to contact the people at the external entity through one or more communication modes, as well as to view one or more of conversations, recent documents, and photos associated with the people at the external entity.

The operations included in process 800 are for illustration purposes. Provision of external contact connections may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to some embodiments, a means to provide external contact connections may be provided. Example means may include receiving, at a communication service of a recipient, a communication from a sender associated with an external entity, retrieving contact information for people at the external entity who are associated with the recipient from a directory service associated with the communication service, a social network, and/or a professional network, processing the retrieved contact information to create corresponding contact objects, processing the contact objects to create an entity object for the external entity that comprises one or more connections between the recipient and the people at the external entity, and providing to be displayed the entity object to the recipient.

According to some examples, methods to provide external contact connections may be provided. An example method may include receiving, at a communication service of a recipient, a communication from a sender associated with an external entity, retrieving contact information for people at the external entity who are associated with the recipient from a directory service associated with the communication service, a social network, and/or a professional network, processing the retrieved contact information to create corresponding contact objects, processing the contact objects to create an entity object for the external entity that comprises one or more connections between the recipient and the people at the external entity, and providing to be displayed the entity object to the recipient.

In other examples, the contact objects may include primary contact objects that represent people at the external entity who are directly associated with the recipient and secondary contact objects that represent people at the external entity who are indirectly associated with the recipient. The primary contact objects may represent people at the external entity who have previously communicated with the recipient through the communication service, are connected with the recipient through the social network, and/or are connected with the recipient through the professional network. The secondary contact objects may represent people at the external entity who have previously communicated with users related to the recipient through the communication service, are connected with the users related to the recipient through the social network, and/or are connected with the users related to the recipient through the professional network.

In further examples, processing the contact objects to create the entity object for the external entity may include filtering the contacts objects to separate the primary contact objects and the secondary contact objects, and processing the primary contact objects and the secondary contact object to create the entity object for the external entity such that the connections between the recipient and the people at the external entity are grouped based on a type of the connections between the recipient and the people at the external entity. The type of the connections between the recipient and the people at the external entity include primary connections comprised of the processed primary contact objects and secondary connections comprised of the processed secondary contact objects. One or more of the secondary contact objects may be removed in response to a determination that one or more of the primary contact objects represent a same person at the external entity prior to processing the primary contact objects and the secondary contacts.

In yet further examples, providing to be displayed the entity object to the recipient includes providing to be displayed an external contact connection card for the external entity. The external contact connection card may allow the recipient to contact the people at the external entity through one or more communication modes. The external contact connection card may allow the recipient to view one or more of conversations, recent documents, and photos associated with the people at the external entity. Contact information may be retrieved for people at the external entity from a directory service associated with the external entity.

According to some embodiments, servers configured to execute an external contact connection module associated with a communication service to provide external contact connections may be described. An example server may include a communication interface configured to facilitate communication between the server and one or more of a directory service associated with the communication service, a social network, a professional network, and one or more client devices, a memory configured to store instructions, and one or more processors coupled to the communication interface and the memory. The processors may be configured to receive a communication from a sender associated with an external entity, retrieve contact information for people at the external entity who are associated with a recipient of the communication from the directory service associated with the communication service, the social network, and/or the professional network, process the retrieved contact information to create corresponding contact objects, process the contact objects to create an entity object for the external entity that comprises one or more connections between the recipient and the people at the external entity, and provide to be displayed the entity object to the recipient.

In other embodiments, the sender associated with the external entity may be a person, a group, a team, or an alias associated with the external entity. The external entity may be an organization, a business, a company, a firm, or an enterprise. The retrieved contact information for each of the people at the external entity who are associated with the recipient may include a name, a telephone number, an email address, an instant messaging address, a title at the external entity, a photograph, and/or data associated with previous communications or connections with the recipient or other users related to the recipient.

In further embodiments, the one or more processors may be further configured to: retrieve contact information for the people at the external entity who are associated with the recipient of the communication from a customer relationship management (CRM) system, where the CRM is associated with a tenant of the communication service or the external entity, and provide the entity object to the CRM system. The external contact connection module may be an integral module of the communication service, an integral module of a client application associated with the communication service that is locally installed on the one or more client devices, or a separate service configured to serve the communication service.

According to some examples, systems configured to provide external contact connections may be described. An example system may include a first server configured to provide a first communication service, where the first communication service is associated with an external entity, and a second server configured to execute an external contact connection module associated with a second communication service. The second server may include a communication interface configured to facilitate communication between the first server and the second server, a memory configured to store instructions, and one or more processors coupled to the communication interface and the memory. The processors may be configured to receive a communication from the first server through the communication interface, where a sender of the communication is associated with the external entity, retrieve contact information for people at the external entity who are associated with a recipient of the communication from a directory service associated with the second communication service, a social network, and/or a professional network, process the retrieved contact information to create corresponding contact objects, process the contact objects to create an entity object for the external entity that comprises one or more connections between the recipient and the people at the external entity, and provide to be displayed the entity object to the recipient.

In other examples, the one or more processors may be further configured to receive an internal communication from within the second communication service, where a sender of the internal communication is associated with a same entity as the recipient and the sender of the internal communication interacts with the external entity, retrieve contact information for people at the external entity who are associated with the sender of the internal communication from the directory service associated with the second communication service, the social network, and/or the professional network, process the retrieved contact information to create corresponding contact objects, and process the contact objects to create an entity object for the external entity that comprises one or more connections between the sender of the internal communication and the people at the external entity.

In further examples, the contact objects may include primary contact objects and/or secondary contact objects. The one or more processors may be further configured to filter the contacts objects to separate the primary contact objects and the secondary contact objects, and process the primary contact objects and the secondary contact object to create the entity object for the external entity, where the connections include primary connections comprised of the processed primary contact objects and secondary connections comprised of the processed secondary contact objects.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to authenticate emails based on information of external contact connections, the method comprising:

receiving, at a communication service of a recipient in a first entity, an email from a sender of a second entity external to the first entity to the recipient of the first entity; and in response to receiving the email from the sender to the recipient of the first entity, with the communication service of the first entity, retrieving, via one or more application programming interfaces, data of contact information of the sender and additional people at the second entity from one or more of a directory service associated with the communication service, a social network, or a professional network;

processing the retrieved data of contact information of the sender and the additional people at the second entity to create corresponding contact objects corresponding to the sender and the additional people at the second entity and an entity object as a digital representation of the second entity;

determining whether the sender has previous communications or connections with the recipient at the first entity or a peer of the recipient at the first entity; and in response to determining that the sender has no previous communications or connections with the recipient at the first entity or a peer of the recipient at the first entity:

determining whether the created contact objects include at least one created contact object representing one of the additional people at the second entity who has previous communications or connections with a peer of the recipient at the first entity or direct communications or connections with the recipient;

in response to determining that the created contact objects include the at least one created contact object representing one of the additional people at the second entity who has previous communications or connections with a peer of the recipient at the first entity or direct communications or connections with the recipient, authenticating the received email to the recipient; and providing for display an indication, in the communication service of the first entity, of the at least one created contact object representing one of the additional people at the second entity and either:

the peer of the recipient at the first entity; or the indication indicating that the at least one created contact object representing the additional people at the second entity has direct communications or connections with the recipient, wherein the indication comprises grouping the contact objects based on a first type of the one or more connections between the recipient and the contact objects or a second type of the one or more connections between the entity object and the contact objects.

2. The method of claim 1, wherein the contact objects include primary contact objects that represent people at the second entity who are directly associated with the recipient and secondary contact objects that represent people at the external entity who are indirectly associated with the recipient.

3. The method of claim 2, wherein the primary contact objects represent people at the second entity who have previously communicated with the recipient through the communication service, are connected with the recipient through the social network, and/or are connected with the recipient through the professional network.

4. The method of claim 2, wherein the secondary contact objects represent people at the second entity who have previously communicated with users related to the recipient through the communication service, are connected with the users related to the recipient through the social network, or are connected with the users related to the recipient through the professional network.

5. The method of claim 2, wherein processing the retrieved data comprises:
   filtering the contacts objects to separate the primary contact objects and the secondary contact objects; and
   processing the primary contact objects and the secondary contact object to create the entity object for the second entity such that the one or more connections between the recipient and the people at the second entity are grouped based on a type of the one or more connections between the recipient and the people at the second entity.

6. The method of claim 5, wherein the type of the one or more connections between the recipient and the people at the second entity include primary connections comprised of the processed primary contact objects and secondary connections comprised of the processed secondary contact objects.

7. The method of claim 5, further comprising:
   removing one or more of the secondary contact objects in response to a determination that one or more of the primary contact objects represent a same person at the second entity prior to processing the primary contact objects and the secondary contacts.

8. The method of claim 1, wherein the method further comprises:
   providing to be displayed an external contact connection card for the second entity.

9. The method of claim 8, wherein the external contact connection card allows the recipient to contact the people at the second entity through one or more communication modes and to view one or more conversations, recent documents, and photos associated with the people at the second entity.

10. The method of claim 1, wherein grouping further comprises sub-grouping the contact objects based on a type of contact corresponding to the contact objects.

11. The method of claim 1, further comprising:
    retrieving contact information for people at the second entity from a directory service associated with the second entity.

12. A method to authenticate emails based on information of external contact connections, the method comprising:
    upon receiving, at a communication service of a recipient in a first entity, an email from a sender of a second entity external to the first entity to the recipient of the first entity,
    accessing, via one or more application programming interfaces, data of contact information of the sender and additional people at the second entity from a directory service associated with the communication service, a social network, or a professional network;
    creating, based on the accessed data of contact information of the sender and the additional people at the second entity, contact objects corresponding to the sender and the additional people at the second entity and an entity object that is a digital representation of the second entity;
    determining whether the sender has previous communications or connections with the recipient or a peer of the recipient at the first entity; and
    in response to determining that the sender has no previous communications or connections with the recipient or a peer of the recipient at the first entity:
      determining whether the created contact objects include at least one created contact object representing one of the additional people at the second entity who has previous communications or connections with a peer of the recipient at the first entity or direct communications or connections with the recipient;
      in response to determining that the created contact objects include the at least one created contact object representing one of the additional people at the second entity who has previous communications or connections with a peer of the recipient at the first entity or direct communications or connections with the recipient, authenticating the received email; and
      providing for display an indication, in the communication service of the first entity, of the at least one created contact object representing one of the additional people at the second entity and either:
        the peer of the recipient at the first entity; or
        the indication indicating that the at least one created contact object representing the additional people at the second entity has direct communications or connections with the recipient,
      wherein the indication comprises grouping the contact objects based on a first type of the one or more connections between the recipient and the contact objects or a second type of the one or more connections between the entity object and the contact objects.

13. The method of claim 12, wherein the contact objects include primary contact objects that represent people at the second entity who are directly associated with the recipient and secondary contact objects that represent people at the second entity who are indirectly associated with the recipient.

14. The method of claim 12, wherein the contact objects include primary contact objects and secondary contact objects, and wherein the primary contact objects represent people at the second entity who have previously communicated with the recipient through the communication service, are connected with the recipient through the social network, or are connected with the recipient through the professional network.

15. The method of claim 12, wherein the contact objects include primary contact objects and secondary contact objects, and wherein the secondary contact objects represent people at the second entity who have previously communicated with users related to the recipient through the communication service, are connected with the users related to the recipient through the social network, or are connected with the users related to the recipient through the professional network.

16. The method of claim 12, wherein:
    the contact objects include primary contact objects that represent people at the second entity who are directly associated with the recipient and secondary contact objects that represent people at the second entity who are indirectly associated with the recipient; and
    creating the contact objects comprises:
    filtering the contacts objects to separate the primary contact objects and the secondary contact objects; and
    processing the primary contact objects and the secondary contact object to create the entity object for the second entity such that the one or more connections between the recipient and the people at the second entity are grouped based on a type of the one or more connections between the recipient and the people at the second entity.

17. A computing device configured to authenticate emails based on information of external contact connections, the computing device comprising:
   a processor; and
   a memory operatively coupled to the processor, the memory containing instructions executable by the processor to cause the computing device to:
   upon receiving, at a communication service of a recipient in a first entity, an email from a sender of a second entity external to the first entity to the recipient of the first entity,
   access, via one or more application programming interfaces, data of contact information of the sender and additional people at the second entity from a directory service associated with the communication service, a social network, or a professional network;
   generate, based on the accessed data of contact information of the sender and the additional people at the second entity, contact objects corresponding to the people at the second entity and an entity object that is a digital representation of the second entity;
   determining whether the sender has previous communications or connections with the recipient at the first entity or a peer of the recipient at the first entity; and
   in response to determining that the sender has no previous communications or connections with the recipient at the first entity or a peer of the recipient at the first entity:
      determine whether the created contact objects include at least one created contact object representing one of the additional people at the second entity who has previous communications or connections with a peer of the recipient at the first entity or direct communications or connections with the recipient;
      in response to determining that the created contact objects include the at least one created contact object representing one of the additional people at the second entity who has previous communications or connections with a peer of the recipient at the first entity or direct communications or connections with the recipient, authenticate the received email; and
      provide for display an indication, in the communication service of the first entity, of the at least one created contact object representing one of the additional people at the second entity and either:
         the peer of the recipient at the first entity; or
         the indication indicating that the at least one created contact object representing the additional people at the second entity has direct communications or connections with the recipient,
      wherein the indication comprises grouping the contact objects based on a first type of the one or more connections between the recipient and the contact objects or a second type of the one or more connections between the entity object and the contact objects.

18. The computing device of claim 17, wherein the contact objects include primary contact objects that represent people at the second entity who are directly associated with the recipient and secondary contact objects that represent people at the external entity who are indirectly associated with the recipient.

19. The computing device of claim 17, wherein the contact objects include primary contact objects and secondary contact objects, and wherein the primary contact objects represent people at the second entity who have previously communicated with the recipient through the communication service, are connected with the recipient through the social network, or are connected with the recipient through the professional network.

20. The computing device of claim 17, wherein:
   the contact objects include primary contact objects that represent people at the second entity who are directly associated with the recipient and secondary contact objects that represent people at the second entity who are indirectly associated with the recipient; and
   to generate the contact objects comprises to:
   filter the contacts objects to separate the primary contact objects and the secondary contact objects; and
   generate the primary contact objects, the secondary contact object, and the entity object for the external entity such that the one or more connections between the recipient and the people at the second entity are grouped based on a type of the one or more connections between the recipient and the people at the second entity.

* * * * *